United States Patent Office 3,126,251
Patented Mar. 24, 1964

3,126,251
PLUTONIUM RECOVERY FROM NEUTRON-BOMBARDED URANIUM FUEL
Raymond H. Moore, Kennewick, Wash., assignor to the United States of America as represented by the United States Atomic Energy Commission
No Drawing. Filed Oct. 10, 1962, Ser. No. 229,769
9 Claims. (Cl. 23—14.5)

This invention deals with a process of recovering plutonium from neutron-bombarded uranium fuel by salt extraction.

Neutron-bombarded fuel has been processed heretofore by dissolving it in an about equimolar molten mixture of potassium chloride and aluminum chloride, whereby the uranium and plutonium are dissolved as the tetrachlorides; heating the reaction mixture to above 700° C., whereby the plutonium tetrachloride is decomposed to plutonium trichloride; adding a lithium chloride-sodium chloride salt mixture, which is immiscible with the double salt, whereby the plutonium trichloride is taken up by the salt mixture while the uranium tetrachloride remains dissolved in the double salt; and separating the salt mixture from the double salt. This process is patented in U.S. Patent No. 3,029,130, granted to this applicant on April 10, 1962.

This patented process, while generally satisfactory, has the drawback that the plutonium tetrachloride forms rather stable complexes with potassium chloride and/or aluminum chloride, so that the reduction of the plutonium tetrachloride and thus the separation from the uranium is incomplete at temperatures of between 700 and 750° C. In the example of the above-mentioned patent a plutonium chloride reduction of about 70% was accomplished at between 700 and 750° C. At temperatures above 750° C. better results can be obtained, but then corrosion occurs to an undesirably high degree.

It is an object of this invention to provide a process for the separation of plutonium from uranium by salt extraction by which an especially high separation factor is obtained.

It is also an object of this invention to provide a process for the separation of plutonium from uranium by salt extraction which can be carried out at comparatively low temperatures so that little corrosion only takes place.

It is still another object of this invention to provide a process for the separation of plutonium from uranium by salt extraction which, since it can be carried out at low temperatures, requires a low energy consumption.

It is finally also an object of this invention to provide a process for the separation of plutonium from uranium by salt extraction for which an inert atmosphere need not be used.

It has been found that stannous chloride, when added to a solution of plutonium and uranium chlorides in molten aluminum-potassium chloride double salt, reduces the plutonium tetrachloride to plutonium trichloride, uranyl chloride to uranium tetrachloride, but does not reduce uranium tetrachloride to uranium trichloride. This selective reduction with stannous chloride can be carried out at lower temperatures than those necessary for the patented process and yet with more quantitative yields, as will be shown later.

The process of this invention is based on this finding. It comprises introducing the fuel to be processed into a molten potassium chloride-aluminum chloride mixture of approximately equimolar composition, whereby plutonium and uranium are dissolved mainly as plutonium tetrachloride, uranium tetrachloride and uranyl chloride, adding lithium chloride to the reaction mixture, adding stannous chloride whereby the uranyl chloride is reduced to the tetrachloride and the plutonium tetrachloride is reduced to plutonium trichloride, and separating a plutonium-trichloride-containing lithium chloride phase from the uranium-tetrachloride-containing double salt.

Any chlorinatable nuclear fuel can be used for the process of this invention. The temperature preferably ranges between 450 and 625° C. A great number of experiments were carried out to determine the proportions of double salt and lithium chloride and also the optimal ratio of potassium chloride and aluminum chloride in the double salt, and three-phase solubility diagrams were plotted on the basis of these experiments. As to the ratio of aluminum chloride and potassium chloride in the double salt, it was found that the potassium chloride content preferably ranges between 50 and 60 mole percent and that the content of aluminum chloride consequently is between 50 and 40 percent. The aluminum chloride content of the double salt is dependent to a certain degree on the temperature used within the above-specified range, the lower temperature requiring less aluminum chloride than the higher temperature.

The lithium chloride content may range between 10 and 95 mole percent of the ternary salt mixture. It, too, is dependent upon the temperature, the higher temperature requiring a higher lithium chloride content. At a temperature of 450° C. lithium chloride is preferably present in a quantity of from 10 to 40 mole percent, at 525° C. from 15 to 65 mole percent, and at 625° C. the lithium chloride content may vary between 15 and 95 mole percent.

The following example shows the distribution coefficients that were obtained at different temperatures for uranium and plutonium tri- and tetrachlorides.

EXAMPLE I

A lithium chloride-potassium chloride-aluminum chloride two-phase salt system of identical composition was used in all runs of this example, and various chlorides were introduced into the system at different temperatures. In each run the lithium chloride and the double salt phases obtained were analyzed for their plutonium or uranium contents after equilibration and phase separation. From the analytical results the distribution coefficients K (weight percent of metal in double salt:weight percent of same metal in lithium chloride) were calculated.

In run No. 1 stannous chloride was present as a holding reductant to prevent oxidation of the uranium tetrachloride to uranyl chloride. In runs 3 and 4 reduction of plutonium tetrachloride was prevented by passing a current of chlorine through the salt system. In run No. 5 the plutonium trichloride was obtained by adding stannous chloride in an excessive amount to the salt system according to this invention, while in run No. 6 the reduction was carried out by incorporating aluminum metal instead of the stannous chloride of run No. 5. The results are compiled in Table I.

Table I

| Run No. | Substance | K | Temperature, °C. |
|---|---|---|---|
| 1 | UCl$_4$ | 0.91 | 625 |
| 2 | UCl$_3$ | 0.021 | 625 |
| 3 | PuCl$_4$ | 1.93 | 625 |
| 4 | PuCl$_4$ | 3.05 | 450 |
| 5 | PuCl$_3$ | 0.11 | 525 |
| 6 | PuCl$_3$ | 0.037 | 725 |

The above data show that uranium and plutonium can be separated only when they are present in different valence states.

Stannous chloride is preferably added in an excessive amount over that stoichiometrically necessary to reduce all uranyl chloride and plutonium tetrachloride to the tetrachloride and trichloride, respectively. Any excess of stannous chloride is easily removed, since it is converted in air to stannic chloride which volatilizes about 114° C.

As indicated, the process does not require the use of an inert gas but can be carried out in an atmosphere of air. In some instances it was found advisable, in order to make certain that all plutonium tetrachloride is reduced to the trichloride, to add a second portion of stannous chloride immediately prior to phase separation.

In the following, another example is given to illustrate the process of this invention.

EXAMPLE II

Two runs were carried out, each with a uranium dioxide-plutonium dioxide mixture of a molar ratio of about five. The oxide mixture was dissolved in equimolar potassium-aluminum chloride. Thereafter molten lithium chloride and stannous chloride were added, the reaction mass was agitated for about 20 minutes, and the phases were then allowed to separate. Another portion of stannous chloride was then added, and immediately thereafter the two salt phases were separated. The temperature of the salt mixture during the entire operation was about 625° C.

Both phases were analyzed for uranium and plutonium. The distribution coefficients for uranium tetrachloride and plutonium trichloride were determined in both runs from the analytical results, and from the distribution coefficients the separation factors were ascertained. (The separation factor is the distribution coefficient for $UCl_4$:distribution coefficient for $PuCl_3$.) The results of the two runs are listed in Table II together with the corresponding distribution coefficients and separation factors that were obtained in the example of U.S. Patent No. 3,029,130.

Table II

| Run No. | $K_{UCl_4}$ | $K_{PuCl_3}$ | Separation Factor |
|---|---|---|---|
| 1 | 1.48 | 0.043 | 34.4 |
| 2 | 0.50 | 0.030 | 17 |
| USP 3,029,130 | 2.0 | 0.43 | 4.7 |

The discrepancy of the values for uranium tetrachloride in runs 1 and 2 probably is caused by an inaccuracy of analysis and perhaps also by a slight deviation of the operating temperatures. The above runs show that, in spite of the lower temperature of 625° C. used for runs 1 and 2, a considerably higher separation factor was obtained than with the patented process at between 700 and 750° C.

It will be understood that the invention is not to be limited to the details given herein but that it may be modified within the scope of the appended claims.

What is claimed is:

1. A process of recovering plutonium from a chlorinatable fuel material containing said plutonium together with uranium, comprising immersing said fuel material in a molten about equimolar double salt mixture of aluminum chloride and potassium chloride, whereby uranium and plutonium are dissolved as plutonium tetrachloride, uranium tetrachloride and uranyl chloride; adding molten lithium chloride and stannous chloride to the reaction mass, whereby uranyl chloride is reduced to uranium tetrachloride, the plutonium tetrachloride is reduced to plutonium trichloride, the uranium tetrachloride is dissolved in the double salt and the plutonium trichloride is dissolved in a separate lithium chloride phase; and separating the lithium chloride phase from the double salt.

2. The process of claim 1 wherein the reaction is carried out at between 450 and 625° C.

3. The process of claim 1 wherein the process is carried out in an atmosphere of air.

4. The process of claim 1 wherein the double salt contains from 50 to 60 mole percent of potassium chloride and from 50 to 40 mole percent of aluminum chloride, and stannous chloride is added in a three- to fivefold excess over the amount necessary to reduce all uranyl chloride to the tetrachloride and all plutonium tetrachloride to the trichloride.

5. The process of claim 4 wherein the lithium chloride of the ternary salt mixture ranges between 10 and 95 mole percent, the balance being the double salt.

6. The process of claim 5 wherein the temperature is about 450° C. and the lithium chloride content of the ternary salt is between 10 and 40 mole percent.

7. The process of claim 5 wherein the temperature is about 525° C. and the lithium chloride content of the ternary salt is between 15 and 65 mole percent.

8. The process of claim 5 wherein the temperature is about 625° C. and the lithium chloride content of the ternary salt is between 15 and 95 mole percent.

9. A process of recovering plutonium from nuclear fuel containing plutonium oxide and uranium oxide, comprising immersing said fuel in a molten about equimolar mixture of aluminum chloride and potassium chloride, whereby uranium and plutonium are dissolved as uranyl chloride, uranium tetrachloride and plutonium tetrachloride; adding from 15 to 95 mole percent of lithium chloride to the reaction mixture while maintaining a temperature of about 625° C. and an atmosphere of air; adding stannous chloride in about five times the amount necessary for the reduction of uranyl chloride to the tetrachloride and plutonium tetrachloride to the trichloride and agitating the mixture; allowing the double salt to separate from a lithium chloride phase; and separating the uranium-tetrachloride-containing double salt from the plutonium-trichloride-containing lithium chloride phase.

References Cited in the file of this patent

UNITED STATES PATENTS 3,029,130     Moore                 Apr. 10, 1962

OTHER REFERENCES

The Condensed Chemical Dictionary, 4th Edition, Reinhold Publishing Corp. (1950), page 626.